April 12, 1966            H. DE LANG            3,245,307

MOIRE FRINGE APPARATUS FOR MEASURING SMALL MOVEMENTS

Original Filed Jan. 20, 1959            3 Sheets-Sheet 1

INVENTOR
HENDRIK DE LANG
BY
AGENT

April 12, 1966     H. DE LANG     3,245,307
MOIRE FRINGE APPARATUS FOR MEASURING SMALL MOVEMENTS
Original Filed Jan. 20, 1959     3 Sheets-Sheet 2
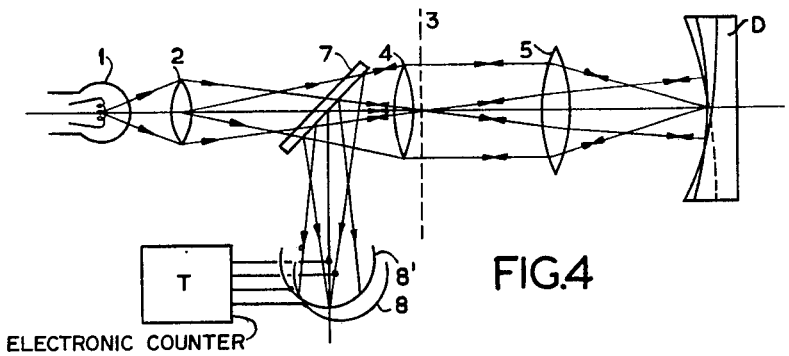
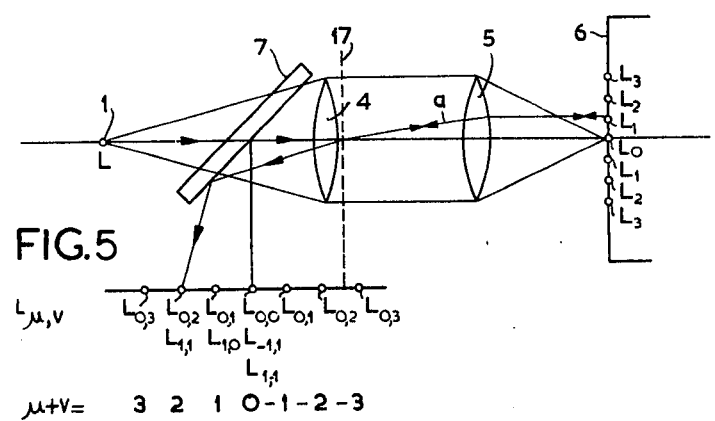
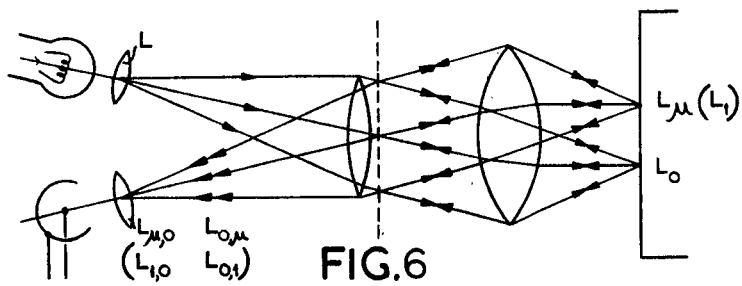
INVENTOR
HENDRIK DE LANG
BY
AGENT 3,245,307
MOIRE FRINGE APPARATUS FOR MEASURING
SMALL MOVEMENTS
Hendrik de Lang, Emmasingel, Eindhoven, Netherlands, assignor to North American Philips Company, Inc., New York, N.Y., a corporation of Delaware
Continuation of application Ser. No. 787,847, Jan. 20, 1959. This application Sept. 24, 1962, Ser. No. 226,773
Claims priority, application Netherlands, Jan. 21, 1958, 224,249
14 Claims. (Cl. 88—14)

This application is a continuation of application Serial No. 787,847, filed January 20, 1959, now abandoned.

My invention relates to a device for measuring small movements very accurately. In particular, the invention relates to a device for measuring the displacement of a movable member with respect to a fixed point, for example, the movement of a machine tool.

In adjusting devices in which rectilinear movements are performed, for example in machine tools, such as drilling machines, milling machines and the like, it is sometimes necessary that small displacements of a movable member with respect to a stationary member, which are performed manually or automatically, for example a displacement of a slide with respect to a frame, shall be measured automatically with great accuracy.

Optical-electronic apparatus have been used for this purpose which comprises a plurality of optical line rasters, one of which is coupled to the movable member and another which is stationary. In this case a light source is provided which throws a beam of rays through the rasters, so that upon relative movement of the rasters light pulses are produced which are converted into electric pulses by means of a photo-electric cell or similar element. Such pulses are counted by electronic means, their number being a measure of the displacement.

A known device of this kind utilizes two rasters having, for example, 2000 lines per cm. on a transparent background, one of which can move together with the slide of a machine tool in a direction substantially at right angles to the lines, whereas the other is stationary. The light beam is periodically interrupted or weakened.

Devices are also known in which the pulses produced by the movement in one direction, for example the forward direction, are counted in a positive sense and the pulses produced by the movement in the backward direction are counted in a negative sense. In this case, use is made of a plurality of stationary rasters each combined with a photo-electric cell and arranged with respect to one another so that series of pulses produced in the photo-electric cells are shifted in phase, while the cyclic sequence of the pulses of the various series is dependent upon the direction of the movement. In another case, use is made of two rasters which are slightly turned with respect to each other so as to obtain a moiré pattern. In this case also, series of pulses shifted in phase may be produced in two photo-electric cells. In either case, suitable electronic counting devices are employed, a count being obtained which is positive or negative, dependent upon the direction of the displacement.

The devices of this kind have the disadvantage that two or more rasters are required which must be designed with extraordinary accuracy and which are to be positioned at a very small distance from one another.

An object of the invention is to provide a device in which this disadvantage is substantially or entirely obviated.

The starting point is constituted by a device for measuring displacements, in which a movable member is coupled to a raster, the lines of which are substantially at right angles to the direction of the displacement, and in which means are provided for throwing a light beam on or through the raster and also photo-electric elements for converting the variations in brightness occurring at a point during displacement into electric pulses, the number of these pulses occurring after a given time interval being a measure of the displacement during this time interval and being counted.

According to the invention, an optical system is provided by means of which an image of the raster is produced, which image during the movement of the member to which the raster is coupled performs a movement opposite to that of the raster itself, while the projecting beams of rays again pass through the raster and a varying illumination intensity occurs at the photo-electric element or elements.

The invention will be described with reference to the accompanying drawing in which:

FIGS. 1 to 4 are diagrammatic views of different embodiments of the invention employing lenses;

FIG. 5 is a diagrammatic view of an embodiment provided with a phase raster;

FIG. 6 is a diagrammatic view of another embodiment of the invention;

Figure 1:
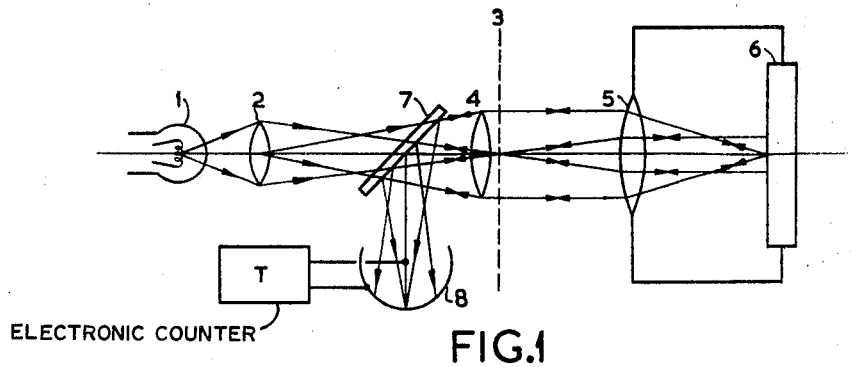

FIG. 1 shows a device comprising a raster 3 having a plurality of lines extending perpendicularly to the plane of drawing and impermeable to light, which lines are spaced apart very slightly and intercept the light perpendicularly striking the surface of the raster, the lines being separated by zones permeable to light which may have the same width as the lines. For example, 2000 lines per cm. length may be present. The raster is coupled in a manner not shown to a movable member (likewise not shown), the direction of displacement of which is parallel to the surface of the raster and at right angles to the lines. In this device, the displacement performed by the body during a determined period can be measured by counting the number of raster lines passed through a determined point during this period.

A light source 1 is also provided, the image of which is produced on the raster 3 by means of a lens 2. Arranged in front of the raster is a lens 4, which produces an image of the lens 2 at infinity. An image of the raster is produced in natural size in the rear focal plane by means of a microscope eye glass 5 which is combined with a plane or spherical mirror 6. The paths of the various rays are indicated by arrows in the figure. The described telecentric arrangement with the mirror in the rear focal plane has the property that the magnification of the image produced is invariably equal to the unit, independent of the axial position of the raster.

The light of the image produced passes through the raster and now strikes via a semi-transparent mirror 7 a photo-electric cell 8 which preferably occupies the position of the ultimate image of lens 2. Since upon a displacement of the raster its image is moving in the opposite direction, a double light variation period occurs when the raster is displaced through a distance equal to the pitch of the raster.

In addition to only a single raster being required, said device affords the advantage that, during the same displacement, double the number of pulses occurs as compared to the known devices described above. The number of pulses may be counted in known manner in an electronic counter T.

Figure 2:
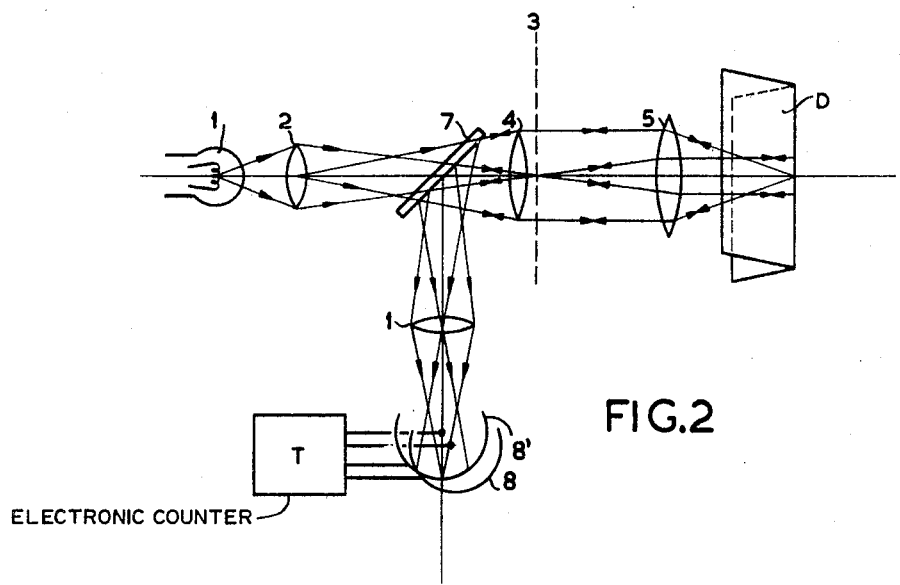

In this device, pulses are counted without distinction being made during counting between the directions of displacement. On the contrary such is the case in the embodiment shown in FIG. 2.

In this embodiment, the path of rays is substantially the same as in FIG. 1, but the ordinary plane or spherical mirror is replaced by a so-called roof mirror D. The two plane reflecting parts thereof are exactly at right angles to each other with their intersecting line substantially at right angles to the direction of the raster lines. Instead of using a roof mirror, it is of course also possible to utilize a roof prism.

The raster is now not inverted but, reflected with respect to the intersecting line of the mirrors, reproduced in itself. If the intersecting line of the rof mirror is turned over a given small angle about the optical axis, an image results at the raster which is turned through double the angle so as to obtain a cross moire at the area of the raster, the dark zones of which are moving substantially in the direction of the raster lines during the movement of the member. In the device shown in FIG. 2, two photo-electric cells 8 and 8' are provided which are arranged in positions shifted in a direction at right angles to the plane of drawing so that the phase difference between the series of pulses produced therein is, for example, 90°. As before, the pulses are counted in the device T, which can now be effected so that distinction is made between the pulses for positive displacements and those for negative displacements.

The recurrence period of the pulses produced by the moiré pattern and hence also the relative phase of the series of pulses are in this case dependent upon the position of the raster lines reproduced with respect to that of the original raster lines. A comparatively small rotation of the roof mirror D or of the raster may thus lead to a strong variation in the phase difference betwen the series of pulses, which may have a detrimental influence upon counting. The embodiments shown in FIGS. 3 and 4 provide improvements in this respect.

Figure 3:
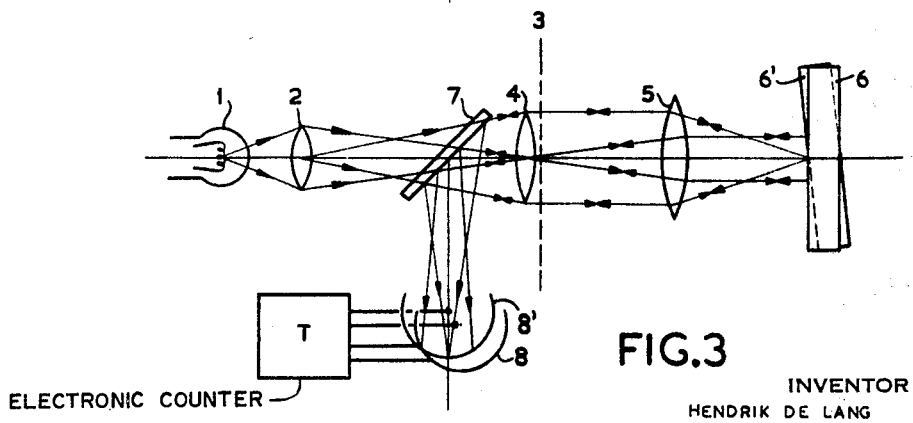

In these embodiments, the path of rays is similar to that of FIG. 1, but in FIG. 3 the mirror comprises two parts 6 and 6' which are slightly turned with respect to each other about an axis parallel to the lines of the raster. It is alternatively possible to use more such mirrors. The same effect may be obtained by partly covering a single mirror with a wedge-like reflecting layer, for example, by applying thereto a metal by evaporation.

The photo-electric cells are positioned at the points where the images of the parts of the mirror are produced. Light variations occurring at the photo-electric cells are shifted in phase. The phase difference between the series of pulses produced is given by $$\frac{4\pi\delta f}{d}$$

wherein $\delta$ is the angle in radians between the parts of the mirror, $d$ is the raster constant or pitch of the raster lines and $f$ is the focal length of the eye-glass. The phase difference may thus be adjusted by adjusting the angle $\delta$. The phase difference is, to a first approximation, independent of the rotation of the direction of the raster lines about the optical axis.

In FIG. 4, the individual parts of the mirror of FIG. 3 are replaced by a continuously reflecting surface D of relatively turned mirror elements by arranging a toric mirror in the rear focal plane of the eye-glass. Instead thereof, it is possible to arrange a toric lens in front of a plane mirror, the direction of the main curvature of said lens being inclined to the direction of the raster lines. In the image of the mirror there occurs a moiré pattern with the period (projected back into the mirror):

$$\frac{d}{f\left(\frac{1}{r_y}-\frac{1}{r_x}\right)}\sin 2\theta$$

wherein $d$ is the raster constant, $f$ is the focal length of the eye-glass, $\theta$ is the angle between the y-direction of the mirror and the raster lines, and $r_x$ and $r_y$ are the radius of the main curvature of the toric mirror in the x- and y-directions. The moiré pattern produced in the plane of the mirror is reproduced at the photo-electric cells. The moiré period is, to a first approximation, independent of small rotations of the direction of the raster lines, if the angle $\theta$ is approximately 45°. However, in practice, it is already sufficient if the angle $\theta$ is large with respect to the average variation in the direction of the raster lines, taken over the field of view, which variation is unavoidable in practice. The moiré period may then be adjusted by means of the magnitude $$\left(\frac{1}{r_y}-\frac{1}{r_x}\right)$$

The moiré period may still be more finely adjusted with the aid of the angle $\theta$.

FIG. 5 shows in an elementary manner the performance of a device according to the invention if it is provided with a phase raster 17. Let us consider a point L of the course 1 of monochromatic light and, as before, a lens 4 is provided for uniting the light rays into a parallel beam. The beam passes through the lens 5, whereafter the rays are united in the focal plane in which the mirror 6 is arranged. Due to the presence of the phase raster 17, the beam breaks up into a plurality of differently directed beams of parallel light rays. The known bending theory is applicable thereto. Said beams lead to bending maxima at the mirror 6 arranged in the focal plane of the lens 5. These are actually images $L_0$, $L_1$, $L_{-1}$, $L_2$ etc. of the point L. The various beams are reflected by the mirror and formed into beams of parallel rays by means of the eye-glass 5. At the area of the raster, said beams lead to an image thereof. At least two beams are required to produce an image by interference. The beams pass through the raster, whereby each beam again breaks up into a plurality of deflected beams which lead via lens 4 and mirror 7 to the bending maxima $L_{0,0}$, $L_{0,1}$, $L_{0,-1}$, $L_{0,2}$ and so on in the plane 16. The indices relate to the order number of the deflected beams upon the first and the second passage through the raster.

The arrows indicate the path of a single ray $a$ which is deflected after the first passage through the raster towards $L_1$ and leads to the maximum $L_{1,1}$ upon the second passage ($a'$).

If, for example, the mirror is made reflecting only at the areas of $L_{\mu_1}$ and $L_{\mu_2}$, only two orders, namely $\mu=\mu_1$ and $\mu=\mu_2$, occur in the ultimate plane of the image at each area. If, now, the raster of FIG. 5 moves downwards over the period of the raster, the forward path for the $\mu$th order becomes $\mu\lambda$ longer and the backward path for the $\gamma$-th order becomes $\gamma\lambda$ shorter. The length of the optical path from L to $L_\mu$, then becomes $(\mu-\gamma)\lambda$ longer.

If $L_{\mu_1}$, $\gamma 1$ and $L_{\mu_2}$, $\gamma 1-\mu_2+\mu_1$ are caused to interfere, then upon displacement of the raster over the raster period, the light varies over $2(\mu_1-\mu_2)$ periods and this purely sinusoidally.

If, for example, $\mu_1=0$ and $\mu_2=1$, then $2(\mu_1-\mu_2)=2$ upon interference of $L_{0,1}$ and $L_{1,0}$. This means that the light fluctuates twice upon each displacement over a raster period. If $\mu_1=1$ and $\mu_2=-1$, a fourfold fluctuation occurs upon interference of $L_{-1,+1}$ and $L_{+1,-1}$, since $2(\mu_1-\mu_2)=4$.

When using an arrangement similar to that of FIG. 3, a signal of each part of the mirror is obtained, the phase difference between the two signals being given by:

$$\frac{\mu_1-\mu_2}{d}\cdot 4\pi\delta f$$

In this case it is again possible to count positively or negatively, dependent upon the sense of the displacement of the raster, by means of two photo-electric cells relatively displaced in a direction at right angles to the lines.

When use is made of an arrangement similar to that of FIG. 4, a moiré pattern is again obtained, in which the moiré period projected back into the mirror is given by $$\frac{1}{f\left(\frac{1}{r_y}-\frac{1}{r_x}\right)\sin 2\theta}\cdot\frac{d}{(\mu_1-\mu_2)}$$

Similarly as in the arrangement of FIG. 4, two photo-electric cells are used in relatively shifted positions in the direction of the lines.

FIG. 6 shows an arrangement serviceable in practice, in which the semi-transparent mirror is omitted.

With an analogous arrangement, the mirror could also be dispensed with in a device operating with absorption rasters.

It is thus fundamentally possible to use arrangements similar to those in FIGS. 1 to 4, provided it is ensured that only the desired orders come into action. If the mirror is made reflecting only at the areas $L_{\mu,1}$ and $L_{\mu,2}$, only two orders namely $\mu=\mu_1$ and $\mu=\mu_2$, occur at each area in the ultimate plane of the image. With rasters in which a considerable portion of the light is concentrated in determined orders (blazing), it is frequently necessary to make this selection of orders in the plane of the mirror.

It is alternatively possible to obtain an image of the raster without the use of lenses. This may be effected in FIG. 7 by means of a roof mirror or roof prism 5, the edge of which is parallel to the lines of the raster. The image of the raster is the reflected image of the raster with respect to the edges.

A cross moiré may then be obtained by slightly turning the edges and the direction of the raster lines with respect to each other about a perpendicular to the plane of the raster.

Instead thereof, it is possible to use a triple mirror or a triple prism, in which event the image of the raster is the reflected image of the raster with respect to the corner point of the mirror. No cross moiré is obtained by turning the raster.

Said arrangement could have the disadvantage that the distance between the raster and the image of the raster becomes comparatively large, so that it is necessary to use a very narrow light source.

Figure 7:
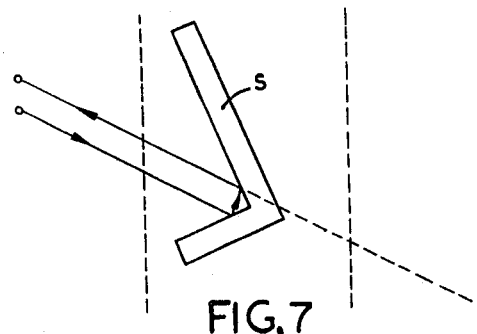
FIGS. 7 to 9 are diagrammatic views of embodiments without lenses.
Figure 8:
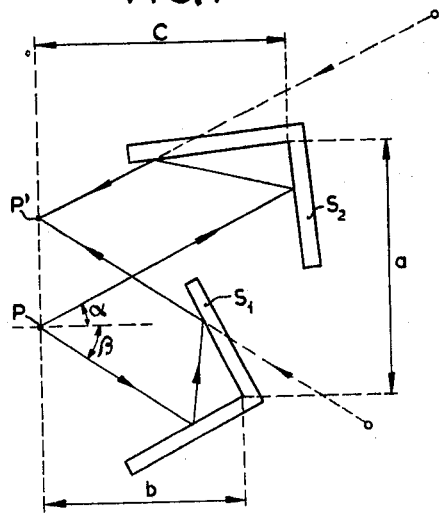

This disadvantage of the arrangement of FIG. 7 may be overcome by using according to FIG. 8, two roof mirrors or roof prisms having their edges $S_1$ and $S_2$, respectively, parallel to the raster lines. The edges are arranged so that the main ray of the order $\mu_1$ emerging from a point P on the raster is reflected by the first roof mirror and the main ray of the order $\mu_2$ is reflected by the second roof mirror in a manner such that the reflected rays meet at point P', which lies substantially at the area of the raster. The condition therefore is:

$$a=b\tan\beta+c\tan\alpha.$$

If this condition is fulfilled, the difference in the length of the optical path from P to P' for the two orders is, to a first approximation, independent of small variations in the direction of the incident ray and this applies to each point of the raster, at least so far the orders fall on the mirror intended therefor. Preferably, $\alpha=\beta$ and $b=c$. In this case, the difference in the length of the optical path is stationary also to a second approximation and furthermore achromatic to a first approximation.

A cross moiré may be obtained by turning the direction of the raster lines with respect to the edges of the mirror about a line perpendicular to the plane of the raster. The moire pattern is obtained in the plane passing through the edges of the mirror.

Assuming that only two orders interfere, the signal obtained upon displacement of the raster is purely sinusoidal.

Instead of using two roof mirrors or prisma, it is alternatively possible to ues two triple mirrors or triple prisms with the lines connecting their corner points at right angles to the lines of the raster. A cross moire cannot now be obtained by turning the raster. A plurality of phase shifted signals may be obtained by designing one surface of one triple mirror of double type. This surface thus comprises two portions shifted in parallel with respect to each other. Actually two sets of triple mirrors are thus obtained.

Figure 9:
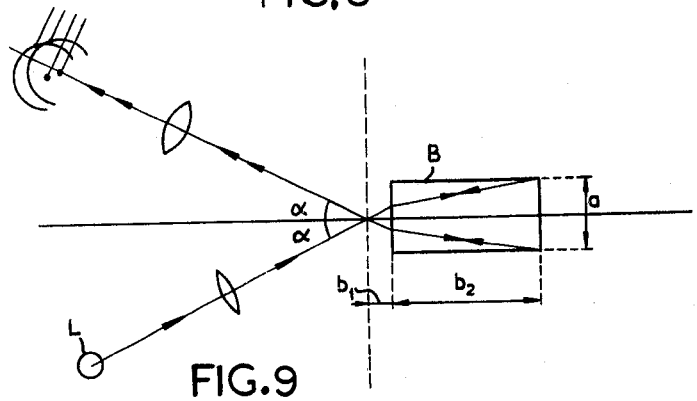

FIG. 9 shows an arrangement which is serviceable in practice. In this arrangement two roof prisms are united into a single block B and, since the rays pass through glass over a large portion of their path, the above-mentioned formula changes to:

$$a=2b_1\tan\alpha+2b_2\tan bg\ 1/n\sin\alpha.$$

The light source 1, which preferably gives monochromatic light or substantially monochromatic light, is positioned at the focus of lens 1. The moire pattern situated in the rear surface of the block of prisms is reproduced by the lens on the photoelectric cells. A moire pattern consisting of lines parallel to the lines of the raster and also situated in the rear surfaces of the prism block may be obtained by causing the angles at the rear surface to differ slightly from 90°.

It will be evident that the two triple prisms may also be united into a single body B (FIG. 9), by means of which a given moire pattern may be obtained.

Of course, it is possible with known optical means for the parts of the light pattern produced at the cells to be separated further from each other if such is required by the dimensions of the photo-electric cells.

While the invention has been described in connection with specific embodiments and applications thereof, other modificaitons will be readily apparent to those skilled in the art without departing from the spirit and scope of the invention as defined in the appended claims.

What I claim is:

1. A device for measuring the displacement of a movable member with respect to a fixed point comprising a rasted coupled to said movable member, said raster having a plurality of parallel spaced lines defining opaque and transparent areas which are oriented substantially perpendicular to the direction of movement of the movable member, means to project a light beam at a given area constituting a portion less than the whole of the raster, optical means for producing a plurality fo phase-displaced images of said raster portion moving in directions other than the direction of movement of the raster at the raster, reflector means positioned to intercept said images and return said phase displaced raster image portions back through said optical means to be coincident with said given area of the raster thereby producing a varying illumination intensity at said given area of said raster, photo-electric means for converting to electrical signals variations in light intensity corresponding to variations in luminous intensity in the phase displaced images of the raster portion as the raster moves, the number of said signals being indicative of the displacement of said raster and the phase of which corresponds to the direction of movement of the raster, and a semi-transparent mirror interposed between said raster and said light beam projecting means to reflect the phase-displaced images to said photo-electric means while transmitting said light beam.

2. A device as claimed in claim 1 in which the optical means for producing phase-displaced images of said raster portion is a roof mirror.

3. A device as claimed in claim 2 in which said roof mirror has an edge inclined to form an angle with a line at right angles to the lines of the raster.

4. A device as claimed in claim 1 in which the optical means for producing phase-displaced images of said portions is a mirror having a toric surface the direction of main curvature of which is rotated through an angle inclined about the main axis with respect to a line parallel to the lines of the raster.

5. A device as claimed in claim 1 in which the optical means for producing phase-displaced images of the raster portion comprises two roof mirrors, the edges of which are substantially parallel to the lines of the raster.

6. A device as claimed in claim 1 in which the optical means for producing phase-displaced images of said raster portion comprises two triple mirrors disposed so that a line connecting their corner points is substantially at right angles to the lines of the raster.

7. A device as claimed in claim 1 in which the optical means for producing phase-displaced images of the raster portion is a roof prism.

8. A device as claimed in claim 1 in which the optical means for producing phase-displaced images of the raster portion comprises two roof prisms, the edges of which are substantially parallel to the lines of the raster.

9. A device as claimed in claim 1 in which the optical means for producing phase-displaced images of the raster portion comprises two triple prisms disposed so that a line connecting their corner points is substantially at right angles to the lines of the raster.

10. A device as claimed in claim 5 in which the two roof mirrors are united into a single body.

11. A device as claimed in claim 6 in which the two triple mirrors are united into a single body.

12. A device as claimed in claim 8 in which the two roof prisms are united in a single body.

13. A device as claimed in claim 9 in which the two triple prisms are united into a single body.

14. A device as claimed in claim 1 in which the photo-electric means includes a photo-electric device responsive to variations in luminous intensity in each of the reflected phase-displaced raster image portions.

References Cited by the Examiner

UNITED STATES PATENTS

| | | | |
|---|---|---|---|
| 1,590,532 | 6/1926 | Lenouvel | 88—56 |
| 2,312,888 | 3/1943 | Everest | 88—14 |
| 2,562,181 | 7/1951 | Frommer | 88—1 |
| 2,857,802 | 10/1958 | Cail | 88—14 |
| 2,886,717 | 5/1959 | Williamson et al. | 88—14 |
| 2,886,718 | 5/1959 | Shepherd et al. | 88—14 |

FOREIGN PATENTS

| | | |
|---|---|---|
| 482,262 | 3/1938 | Great Britain. |
| 782,831 | 9/1957 | Great Britain. |
| 787,641 | 12/1957 | Great Britain. |
| 315,921 | 9/1956 | Switzerland. |

JEWELL H. PEDERSEN, *Primary Examiner.*